(12) United States Patent
Fiedler et al.

(10) Patent No.: US 10,782,210 B2
(45) Date of Patent: Sep. 22, 2020

(54) MOBILE SAMPLING SYSTEM FOR TAKING MULTIPLE FUEL SAMPLES FROM A FUEL TANK

(71) Applicant: ROFA PRAHA S.R.O., Tursko (CZ)

(72) Inventors: Matthias Fiedler, Klosterneuburg-Weidling (AT); Milan Solar, Velvary (CZ)

(73) Assignee: ROFA PRAHA S.R.O., Tursko (CZ)

( * ) Notice: Subject to any disclaimer, the term of this patent is extended or adjusted under 35 U.S.C. 154(b) by 154 days.

(21) Appl. No.: 15/925,940

(22) Filed: Mar. 20, 2018

(65) Prior Publication Data

US 2018/0275019 A1    Sep. 27, 2018

(30) Foreign Application Priority Data

Mar. 27, 2017  (CZ) .................................... 2017-171

(51) Int. Cl.
*G01N 1/10*     (2006.01)
*G01N 1/20*     (2006.01)

(52) U.S. Cl.
CPC .............. *G01N 1/10* (2013.01); *G01N 1/2035* (2013.01); *G01N 2001/1037* (2013.01); *G01N 2001/2064* (2013.01); *G01N 2001/2071* (2013.01)

(58) Field of Classification Search
CPC ................... G01N 1/10; G01N 1/2035; G01N 2001/1037; G01N 2001/2064; G01N 2001/2071; E21B 49/08; F21B 49/00
See application file for complete search history.

(56) References Cited

U.S. PATENT DOCUMENTS

| | | | | |
|---|---|---|---|---|
| 4,905,510 A | * | 3/1990 | Brickhouse | ........... E21B 49/086 73/152.28 |
| 5,098,580 A | * | 3/1992 | Andersen | ................. B67D 7/76 134/186 |
| 7,156,134 B1 | * | 1/2007 | Brakefield | ............... B67D 7/04 141/231 |

(Continued)

FOREIGN PATENT DOCUMENTS

DE    1171180    8/1959
DE    8223543    12/1982

(Continued)

OTHER PUBLICATIONS

Extended European Search Report (18164301.6), dated Aug. 31, 2018.

(Continued)

*Primary Examiner* — Harshad R Patel
*Assistant Examiner* — Nigel H Plumb
(74) *Attorney, Agent, or Firm* — Dority & Manning, P.A.

(57) ABSTRACT

A sampling system for taking fuel samples from an external fuel tank includes a mobile platform, a sample tank carried by the mobile platform, and a supply line connected to the sample tank and configured to conduct the fuel from the external fuel tank into the sample tank. A mixing device is disposed in the sample tank and configured to mix fuel in the sample tank. A discharge line connected to the sample tank and configured to discharge the fuel from the sample tank. A sampling device is configured for removing a partial quantity of the fuel from the sample tank. A method for operating the sampling system is also described.

19 Claims, 1 Drawing Sheet

(56) References Cited

U.S. PATENT DOCUMENTS

| | | | |
|---|---|---|---|
| 9,255,862 B2* | 2/2016 | Klentzman | G01N 1/10 |
| 9,464,968 B2* | 10/2016 | Firstenberg | G01N 1/14 |
| 2009/0107218 A1 | 4/2009 | Latham | |
| 2014/0208873 A1 | 7/2014 | Klentzman | |
| 2015/0247784 A1* | 9/2015 | Leeton | G01N 1/2035 |
| | | | 436/181 |
| 2017/0058670 A1* | 3/2017 | Hassell | B01F 5/0661 |

FOREIGN PATENT DOCUMENTS

| | | |
|---|---|---|
| DE | 3440365 | 5/1986 |
| DE | 8808850 | 11/1988 |
| DE | 295 04 081 U1 | 5/1995 |
| DE | 9420064 | 5/1995 |

OTHER PUBLICATIONS

German Search Report (10 2016 125 203.4), dated Jan. 16, 2017.
Czech Office Action and Translation, Czech Application No. PV 2017-171, dated Feb. 27, 2020, 9 pages.

* cited by examiner

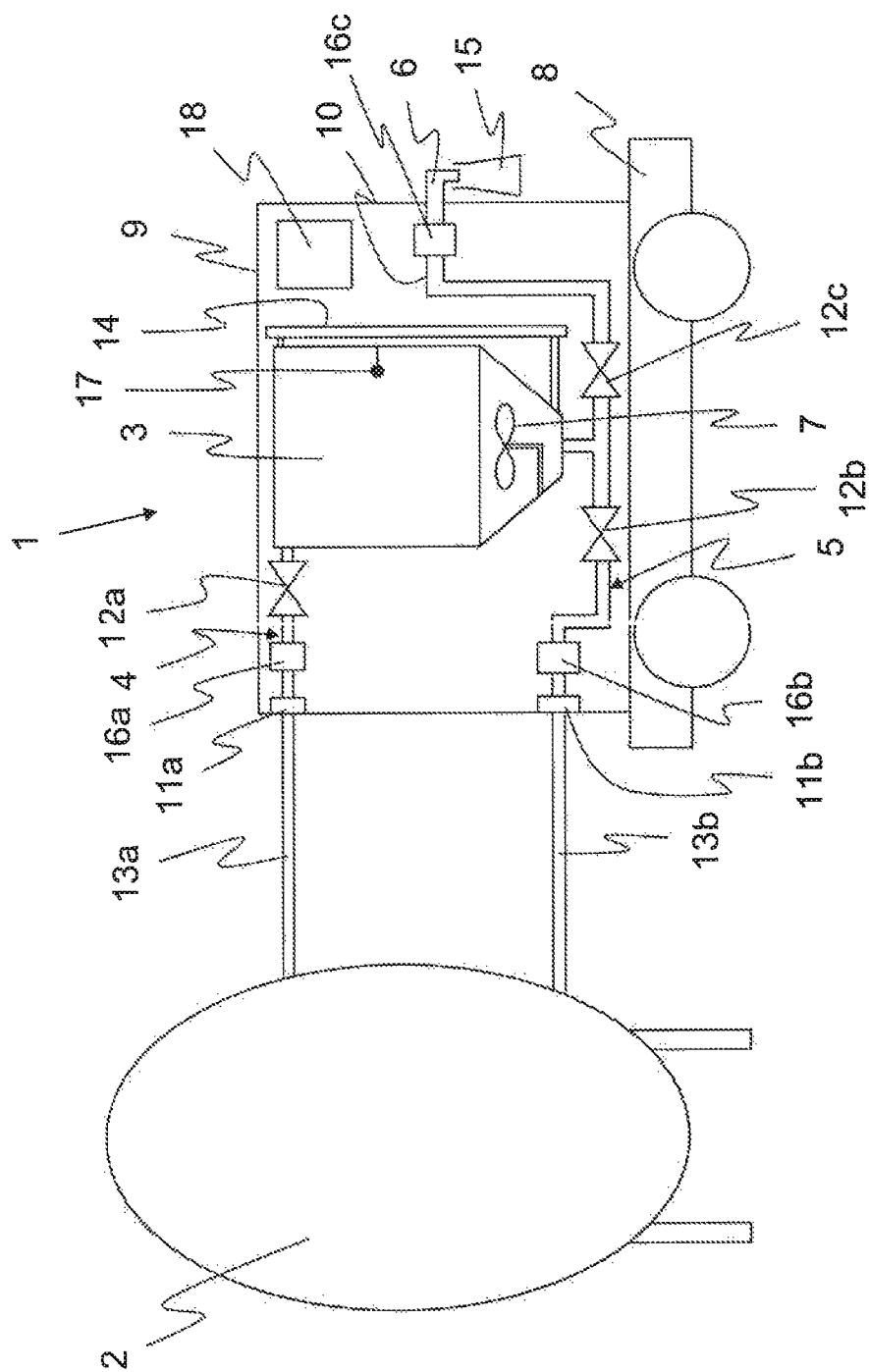

MOBILE SAMPLING SYSTEM FOR TAKING MULTIPLE FUEL SAMPLES FROM A FUEL TANK

FIELD OF THE INVENTION

The present invention relates to a sampling system for taking fuel samples from an external tank with a sample tank for receiving the fuel.

In addition, the present invention relates to a method for ape ng the sampling system.

BACKGROUND

U.S. Pat. No. 9,255,862 B2, which is hereby incorporated herein for all purposes by this reference, discloses a device for taking samples. The device comprises a supply line and a discharge line, through which fuel can be fed into the device or discharged out of the device. In addition, the device features a sampling device, on which a sample can be taken.

SUMMARY OF THE INVENTION

Thus, the task of the present invention is to improve the state of the art.

The task is solved by a sampling system and a method for operating the sampling system with the characteristics described below.

A sampling system for taking fuel samples from an external fuel tank, whereas the sampling system features a sample tank for receiving the fuel, is proposed. The external fuel tank is a fuel tank that is not a part of the sampling system. The external fuel tank may be, for example, a fuel tank on a truck, a fuel tank at a gas station, a fuel tank at a fuel refinery, a fuel tank at a fuel loading station or a fuel tank in or on a building. By means of at least one supply line, the fuel can be conducted from the external fuel tank into the sample tank. In addition, by means of at least one discharge line, the fuel can be discharged from the sample tank (for example, back into the fuel tank). Furthermore, the sampling system features at least one sampling device, by means of which at least a partial amount of the fuel can be removed from the sample tank.

In accordance with the invention, the sampling system is formed to be a system that is mobile (that is, not fixed to a location). In particular, the sampling system can also be a self-supporting, mobile system, whereas all of the additional components necessary for the operation of the sampling system are integrated onto the mobile system. The mobile system allows the sampling system to be brought to an external point of use. For example, it no longer needs to be permanently installed at a fuel refinery or at a fuel loading location. This provides a high degree of flexibility of the sampling system, which saves costs for the operator, since the operator has to buy only one or a few sampling systems for several fuel refineries or fuel loading locations.

In an advantageous additional form of the invention, the sampling system is arranged on a motor vehicle. Alternatively, the sampling system can also be arranged on a trailer for a motor vehicle. This makes the sampling system particularly easy to transport.

In addition or alternatively, it is advantageous if the sampling system comprises a base support, on which the other functional elements of the sampling device are directly or indirectly attached. As a result, all functional elements are arranged compactly on the sampling system.

It is also advantageous if the sample tank comprises a mixing device, by means of which the fuel present in the sample tank can be mixed. The mixing device may be, for example, a stirring system that mixes the fuel by means of a stirrer. The fuel may be mixed, for example, if the fuel from several external tanks had been conducted into the sample tank. At that point, a uniform fuel sample can be mixed from it.

Furthermore, it is advantageous if the sampling device is connected to the sample tank by means of a transport line. As a result, the sampling device can be arranged in a manner spatially separated from the sample tank. In addition, this allows multiple sampling devices to be operated at different points in the sampling system. At the sampling device, a fuel sample can be taken; such sample is taken to a laboratory and analyzed there. The sampling device may also feature an outlet tap and/or a dosing device, such that a certain partial quantity of fuel can be filled at the sampling device into a container. The sampling device may also feature a valve, such as a rotary valve, which may be manually or electrically opened and closed for the aforementioned sampling, in order to draw off the partial quantity of fuel. The fuel drawn off into the container can then be sent to a laboratory for analysis.

It is also advantageous if a coupling is arranged on the supply line. In addition or alternatively, a coupling may also be arranged on the discharge line. A connecting line connected to the external fuel tank can be coupled by means of the coupling, such that the fuel can be conducted from the external fuel tank via the connecting line into the sampling system. At this, the connecting line is coupled to the supply line at the coupling. In addition or alternatively, the fuel from the sampling system can also be conducted back into the external fuel tank via the connecting line coupled to the coupling. At this, the connecting line is coupled to the discharge line at the coupling. Of course, two connecting lines can also be coupled to the sampling system, specifically at the coupling to the supply line and at the coupling to the discharge line.

In an advantageous additional form of the invention, the supply line, the discharge line, the connecting line(s) and/or the transport lines comprise pipes. As a result, a high stability of the specified lines is provided. In addition or alternatively, the supply line, the discharge line, the connecting line(s) and/or the transport lines may also comprise flexible lines. This increases the flexibility of the specified lines.

In order to increase the safety of the sampling system, it is advantageous if the supply line, the discharge line, the connecting line and/or the transport line feature a gas recirculation for fuel vapors. Since, generally, the fuel can form gases during sampling that may ignite, for example, at electrical components of the sampling system, the gas recirculation is an important safety feature. The gas recirculation can be, for example, a gas line at the supply line, the discharge line, the connecting line(s) and/or the transport line, via which the flammable gases are preferably extracted by means of an extractor. For this purpose, the gas line may feature an opening, which is advantageously arranged in the area of one end of the specified lines and/or the couplings. In addition or alternatively, the gas recirculation can also be arranged in the area of the sampling device, since increased gas formation occurs here on the basis of the filling of the fuel in the container.

It is also advantageous if the sample tank comprises a temperature sensor for measuring the temperature of the fuel in the sample tank. The temperature sensor may also be arranged, for example, in the supply line, the discharge line, the connecting line and/or the transport line. The temperature sensor may also be in direct contact with the fuel, in particular, in order to obtain an unadulterated measurement signal. Based on the measured temperature, the sampling system may be turned off if the temperature of the fuel exceeds a value, since the fuel itself can ignite.

It is also advantageous if the sample tank comprises at least one filling level sensor. At this, for example, a multiple number of filling level sensors can be arranged, which emit a signal at a certain level of the fuel in the sample tank. As a result, if the sample tank holds a defined amount of fuel, the sensors can detect whether it is filled to 50%, 90% or 100% (for example).

Furthermore, it is advantageous if the sampling system features one or more pumps, with the assistance of which the fuel can be pumped from the external fuel tank to the sample tank. By means of the one or more pumps, the fuel can additionally or alternatively be pumped from the sample tank to the sampling device. In addition or alternatively, the fuel may also be pumped from the sampling system back to the external fuel tank.

It is likewise advantageous if the sampling system features at least one valve, with the assistance of which the supply line, the discharge line, the transport line and/or the connecting line can be shut off. The at least one valve can be electrically controlled, for example. For example, the flow of fuel may be interrupted if a certain filling level in the sample tank and/or a certain time of filling the sample tank is reached. The valve can also be closed and/or opened manually. In the valve or in the area of the valve, a flow meter may also be arranged; this measures the quantity of fuel passing through the valve, such that it is possible to deduce the quantity of fuel in the sample tank.

It is also advantageous if the sampling system comprises a control device, with the assistance of which the temperature sensor and/or the filling level sensor can be monitored. In addition or alternatively, the pump and/or the valve can be controlled by means of the control device. The control device is further formed in such a manner that it monitors the filling and/or emptying of the sample tank and/or the mixing of the fuel in the sample tank. For example, if the fuel has reached a certain filling level in the sample tank, it can close a valve in the supply line, such that further filling is interrupted. Thereafter, the control device may activate the mixing device in the sample tank, such that the fuel is mixed. After mixing, the control device may open a valve in the transport line and activate a pump in the transport line, such that the partial quantity of the fuel is conducted to the sampling device for sampling. In an additional step; the control device may drain the sample tank via the discharge line by opening a valve in the discharge line and activating a pump in the discharge line.

The control device may also include a display, on which a worker can monitor the operating status of the sampling system. The control device may also feature control elements, on which commands for operating the sampling system may be entered.

Furthermore, a method is proposed for operating a sampling system, which is formed, for example, according to one or more characteristics of the preceding and/or following description. With the method, the sampling system is first transported to an external fuel tank in order to extract a fuel sample therefrom. For this purpose, the sampling system is coupled to the external fuel tank by means of a supply line. Thereafter, the fuel for sampling is conducted from the external fuel tank to a sample tank of the sampling system. After sampling, the sampling system is once again disconnected from the external fuel tank.

Due to the mobility of the sampling system, with the assistance of only one sampling system, a multiple number of samples can be removed from external fuel tanks (even those that are physically far apart), such that costs are saved.

In addition, the sample can be taken from the location of the external fuel tank. Thus, no transport of the external fuel tank to the sampling system is necessary. This saves additional costs, since it is generally more cost-effective, easier and less time-consuming to transport the sampling system to the external fuel tank than to transport the external fuel tank to the sampling system.

In an advantageous additional form of the method, before disconnecting the sampling system, the fuel is emptied by means of a discharge line from the sample tank. At this, the fuel located in the sample tank can be completely returned to the external fuel tank. As a result, no fuel is wasted. Alternatively, the fuel from the sample tank can also be conducted directly to a device that utilizes the fuel.

Furthermore, it is advantageous if, during and/or after the feed of the fuel into the sample tank, a partial quantity of the fuel is conducted to a sampling device. The sampling device may, for example, feature an outlet tap, through which the fuel can be filled into a container. Further, the outlet tap may be opened or closed (for example, by the control device) to discharge the fuel at the outlet tap or to interrupt the discharge. The outlet tap may also be manually opened by a worker if the worker fills the fuel in a container. The sampling device may comprise, for example, a rotatable ball valve, which can be opened and closed by simple rotation.

In addition or alternatively, during and/or after the discharge of the fuel from the sample tank, the partial quantity of the fuel can be conducted to the sampling device. At the sampling device, the partial quantity can be removed for analysis in a laboratory.

It is also advantageous if the fuel is mixed in the sample tank with the assistance of a mixing device. For example, if a multiple number of fuel tanks separated from each other are arranged in the external fuel tank, and a sample is fed into the sample tank from each individual fuel tank, a uniform fuel sample can be formed by means of the mixing.

It is also advantageous if the sample tank comprises at least one filling level sensor, and the filling level sensor is connected to a control device, whereas the control device interrupts the feed of the fuel into the sample tank upon reaching a predetermined filling level. This prevents, for example, an overflow of the fuel in the sample tank.

It is also advantageous if the feed, the discharge and/or the mixing of the fuel is automatically interrupted after a predetermined time. For example, the interruption can be performed in a time interval between 10 s and 300 s. However, the time after which one or more of the above activities is interrupted can also be between 40 s and 150 s.

BRIEF DESCRIPTION OF THE DRAWINGS

Further advantages of the invention are described in the following embodiments. The following is shown:

FIG. 1 a schematic view of a sampling system with an external fuel tank coupled to it.

DETAILED DESCRIPTION OF EXEMPLARY EMBODIMENTS

FIG. 1 shows a schematic view of a sampling system 1 with an external fuel tank 2 coupled to it. Fuel (not shown here) from which a sample is to be taken is located in the external fuel tank 2.

In order to prepare the fuel sample from the external fuel tank 2 for sampling, the sampling system 1 features a sample tank 3. The sampling system 1 also features a supply line 4, via which the fuel can be fed into the sample tank 3. Via a discharge line 5, as shown in this embodiment, the fuel can once again be discharged back into the external fuel tank 2. The discharge line 5 may alternatively lead the fuel directly into a device in which the fuel is recycled (for example).

The sampling system 1 further comprises a sampling device 6, which is connected to the sample tank 3 by means of a transport line 10 in order to fill a sample of the fuel into a container 15. At that point, the sample in the container 15 can be given to a laboratory for analysis.

In order to mix the fuel in the sample tank 3, a mixing device 7 is arranged therein; this comprises, for example, a rotating stirrer. The mixing is particularly advantageous if the external fuel tank 2 features a multiple number of tank sections that are separated from each other and if a fuel sample is conducted into the sample tank 3 from more than one tank section. Through the mixing with the assistance of the mixing device 7, a uniform sample can be produced.

In accordance with the invention, the sampling system 1 is formed as a mobile system. For this purpose, the sampling system 1 is arranged on a trailer 8, in order to, for example, convey it to a stationary external fuel tank 2. In order to achieve the mobility of the sampling system 1, it can also be arranged directly on a motor vehicle.

The sampling system 1 also features two couplings 11a, 11b in this embodiment. The coupling 11a is formed in order to establish a connection between the supply line 4 and the external fuel tank 2. For this purpose, a connecting line 13a is coupled to the coupling 11a, which leads the fuel from the external fuel tank 2 to the supply line 4. The fuel is conducted into the sample tank 3 via the supply line 4.

The coupling 11b is also formed for the purpose of establishing a connection between the discharge line 5 and the external fuel tank 2. The connecting line 13b is arranged at the coupling 11b, via which the fuel from the discharge line 5 is conducted back into the external fuel tank 2. Of course, the fuel does not have to be conducted back to the external fuel tank 2 by means of the connecting line 13b. The fuel may also be conducted with the connecting line 13b into a device that utilizes the fuel.

Furthermore, the sampling system 1 features three valves 12a, 12b, 12c, whereas the valve 12a can shut off and/or release the supply line 4, the valve 12b can shut off and/or release the discharge line 5, and the valve 12c can shut off and/or release the transport line 6.

The sampling system 1 also features three pumps 16a, 16b, 16c, which can pump the fuel from the external fuel tank 2 into the sampling system 1, from the sample tank 3 to the sampling device 6 and from the sampling system 1. At this, the pump 16a is arranged in the supply line 4, such that it pumps the fuel from the external fuel tank 2 into the sample tank 3. In order to pump the fuel out of the sample tank 3, the pump 16b is arranged in the discharge line 5. For sampling, the pump 16c is arranged in the transport line 10, which conveys the fuel to the sampling device 6. Although the pumps 16a, 16b, 16c are described as pumping the fuel in one direction only, they may also be able to pump the fuel in both directions. As such, for example, the pump 16a that is arranged in the supply line 4 can also pump the fuel from the sample tank 3 back into the external fuel tank 2. That is; the sample tank 3 can also be emptied additionally or alternatively via the supply line 4. The same applies, of course, for the other two pumps 16b, 16c.

At the sample tank 4, a filling level sensor 14 is also arranged; by means of this, the filling level of the fuel in the sample tank 3 can be detected.

In the sample tank 3, a temperature sensor 17 is further arranged; with the assistance of this, the temperature of the fuel in the sample tank 3 can be measured. For example, the temperature sensor 17 may include a probe that is arranged in the sample tank 3 and is in direct contact with the fuel.

The sampling system 1 also features a control device 18, by means of which the sampling system 1 can be monitored and controlled. The control device 18 is further connected to the valves 12a, 12b. 12c, the pumps 16a, 16b, 16c, the mixing device 7 and/or the temperature sensor 17 by means of connections that are not shown here. In order to start the feed of the fuel from the external fuel tank 2, the control device may open the valve 12a and activate the pump 16a. In addition, the control device may evaluate the temperature reading from the temperature sensor 17 and, for example, at a critical temperature of the fuel, interrupt the feed of the fuel into the sample tank 3 and/or emit an alarm signal in order to prevent the spontaneous ignition of the fuel.

This invention is not limited to the illustrated and described embodiments. Variations within the scope of the claims, just as the combination of characteristics, are possible, even if they are illustrated and described in different embodiments.

LIST OF REFERENCE SIGNS

1 Sampling system
2 External tank
3 Sample tank
4 Supply line
5 Discharge line
6 Sampling device
7 Mixing device
8 Trailer
9 Base support
10 Transport line
11 Coupling
12 Valve
13 Connecting line
14 Filling level sensor
15 Container
16 Pump
17 Temperature sensor
18 Control device

The invention claimed is:

1. Sampling system for taking fuel samples from an external fuel tank, the sampling system comprising:
   a mobile platform;
   a base support carried by the mobile platform;
   a sample tank carried by the base support and configured for receiving the fuel from the external fuel tank;
   a mixing device disposed inside the sample tank and configured to mix fuel that might, be present in the sample tank:
   a supply line connected to the sample tank and configured for conducting fuel between the external fuel tank and the sample tank;
   a discharge line connected to the sample tank and configured for conducting fuel between the external fuel tank and the sample tank;
   a sampling device configured for removing a partial quantity of fuel from the sample tank and configured for storing and releasing the partial quantity of fuel; and a transport line connected to the sample tank and configured for conducting fuel between the sample tank and the sampling device.

2. Sampling system according to claim 1, wherein the mobile platform is part of a self-propelled motor vehicle or a mobile trailer for a self-propelled motor vehicle.

3. Sampling system according to claim 1, further comprising a valve connected to the transport line between the sampling device and the sample tank.

4. Sampling system according to claim 3, further comprising a pump carried by the base support, the pump being connected to the transport line between the sampling device and the sample tank, and the pump being configured and disposed for pumping the fuel between the sample tank and the sampling device.

5. Sampling system according to claim 1, further comprising a coupling arranged on the supply line and configured for connection to a connecting line connected to the external fuel tank such that the fuel can be conducted from the external fuel tank via the connecting line into the sample tank.

6. Sampling system according to claim 5, further comprising a valve connected to the supply line between the coupling and the sample tank.

7. Sampling system according to claim 5, further comprising a pump carried by the base support, the pump being connected to the supply line between the coupling and the sample tank, and the pump being configured and disposed for pumping the fuel between the external fuel tank and the sample tank.

8. Sampling system according to claim 1, further comprising a coupling arranged on the discharge line and configured for connection to a connecting line connected to the external fuel tank such that the fuel can be conducted from the sample tank to the external fuel tank via the connecting line.

9. Sampling system according to claim 8, further comprising a valve connected to the discharge line between the coupling and the sample tank.

10. Sampling system according to claim 8, further comprising a pump carried by the base support, the pump being connected to the discharge line between the coupling and the sample tank, and the pump being configured and disposed for pumping the fuel between the external fuel tank and the sample tank.

11. Sampling system according to claim 1, wherein each of the supply line, the discharge line, and the transport line includes a pipe or a flexible line.

12. Sampling system according to claim 1, further comprising a temperature sensor configured and disposed for measuring the temperature of the fuel in the sample tank.

13. Sampling system according to claim 1, further comprising a filling level sensor configured and disposed for sensing the level of fuel in the sample tank.

14. Sampling system according to claim 1, further comprising:
a temperature sensor configured and disposed for measuring the temperature of the fuel in the sample tank;
a filling level sensor configured and disposed for sensing the level of fuel in the sample tank;
a coupling arranged on the supply line and configured for connection to a connecting line connected to the external fuel tank such that the fuel can be conducted from the external fuel tank via the connecting line into the sample tank;
a valve connected to the supply line between the coupling and the sample tank;
a pump carried by the base support, the pump being connected to the supply line between the coupling and the sample tank, and the pump being configured and disposed for pumping the fuel between the external fuel tank and the sample tank; and
a control device connected to the temperature sensor and the filling level sensor and configured for monitoring the temperature sensor and the filling level sensor, wherein control device is connected to the pump and the valve and configured for controling the pump and the valve.

15. Method for operating a mobile sampling system that includes a mobile platform; a base support carried by the mobile platform; a sample tank carried by the base support and configured for receiving the fuel from the external fuel tank; a supply line connected to the sample tank and configured for conducting fuel between the external fuel tank and the sample tank; a mixing device disposed inside the sample tank and configured to mix fuel that might be present in the sample tank; a discharge line connected to the sample tank and configured for conducting fuel between the external fuel tank and the sample tank; a sampling device configured for receiving, storing and releasing a partial quantity of the fuel that can be removed from the sample tank; and a transport line connected to the sample tank and configured for conducting fuel between the sample tank and the sampling device, the method comprising the steps of:
using a supply line coupled to the sample tank to pump a partial quantity of the fuel from the external fuel tank to the sample tank;
pumping the fuel to be sampled from the sample tank to the sampling device;
dispensing the fuel from the sampling device into a container; and
disconnecting the sample tank from the external fuel tank.

16. Method according to claim 15, wherein before disconnecting the sample tank, a discharge line is used to empty the fuel from the sample tank back into the external fuel tank.

17. Method according to claim 15, further comprising the step of using a mixing device to mix the fuel in the sample tank.

18. Method according to claim 15, further comprising the step of interrupting the feed of the fuel into the sample tank upon the sample tank reaching a predetermined filling level.

19. Method according to claim 15, wherein during and/or after the feed of the fuel into the sample tank, and/or during and/or after the discharge of the fuel from the sample tank, the partial quantity of the fuel can be conducted to the sampling device.

* * * * *